Feb. 19, 1946.　　　　G. M. DEMING　　　　2,394,987

PRESSURE REGULATOR AND COMPOSITE GAUGE THEREFOR

Filed March 9, 1943

INVENTOR.
George M. Deming
BY
ATTORNEYS

Patented Feb. 19, 1946

2,394,987

UNITED STATES PATENT OFFICE 2,394,987

PRESSURE REGULATOR AND COMPOSITE GAUGE THEREFOR

George M. Deming, Orange, N. J., assignor to Air Reduction Company, Incorporated, a corporation of New York Application March 9, 1943, Serial No. 478,530

1 Claim. (Cl. 73—389)

This invention relates to improvements in gas pressure regulators and their pressure gauges of the type commonly used as part of oxyacetylene cutting and welding equipment. In cutting or welding by means of oxyacetylene torches the oxygen and acetylene are supplied from high-pressure gas cylinders, the gas being passed from the cylinder through an adjustable regulator which reduces its pressure in one or two stages and delivers it at the desired reduced pressure to the hose leading to the torch or torches. One type of regulator has two pressure gauges associated with it, a high-pressure one to indicate the pressure of the gas in the cylinder and a low-pressure one to indicate the pressure of the gas delivered by the regulator. The gauges employed are usually of the familiar type having a cylindrical casing containing the pressure-responsive mechanism and a pointer moving over a scale visible at the front of the casing, the casing being mounted on the pressure regulator by a short length of piping which places the pressure-responsive mechanism within the gauge casing in communication with the proper part of the interior of the regulator casing. Thus the two gauges project upwardly from the regulator casing. This results in an arrangement which has a number of disadvantages such as lack of compactness, unpleasing appearance, and difficult access to the gauge mechanisms for replacements or repairs.

In accordance with this invention the above-described customary practice of associating the gauges with the regulator is abandoned and instead two individual gauge mechanisms are nested and mounted directly on a front wall of the regulator body and enclosed by a common casing, the whole assembly being such that the gauge portion projects but slightly from the general contour of the regulator body. The gauge casing is readily detachable from the regulator body to provide free access to the gauge mechanisms. The gauge mechanisms are detachably mounted on the front wall of the regulator and are individually removable for replacements or repairs. Thus the above-mentioned disadvantages of the usual combination of regulator and gauges are overcome.

One embodiment of the invention is illustrated in the accompanying drawing in which.

The regulator, indicated at 1, may be of a familiar two-stage type. It has an inlet connection 2 for attachment to the high-pressure gas cylinder, and an outlet nipple 3 through which the low-pressure gas may be delivered to the hose leading to the torch, or the like, where the gas is utilized. The regulator has the usual adjusting means, which in the illustrated embodiment of the invention, comprises a knurled knob 4. For the sake of symmetry a dummy knob 4' may be provided at the opposite end of the regulator if desired.

Figure 2:
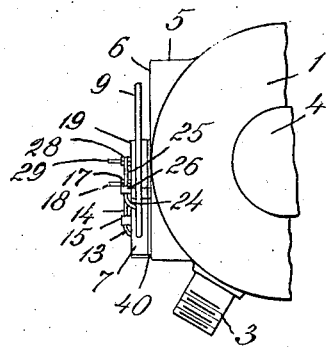
Fig. 2 is a side elevation of the front half of the regulator with the gauge casing removed.

At one side of the regulator there is a boss 5 on the regulator casing having a flat front wall 6 (Fig. 2). The two gauge mechanisms are mounted on this front wall of the regulator casing.

Figure 3:
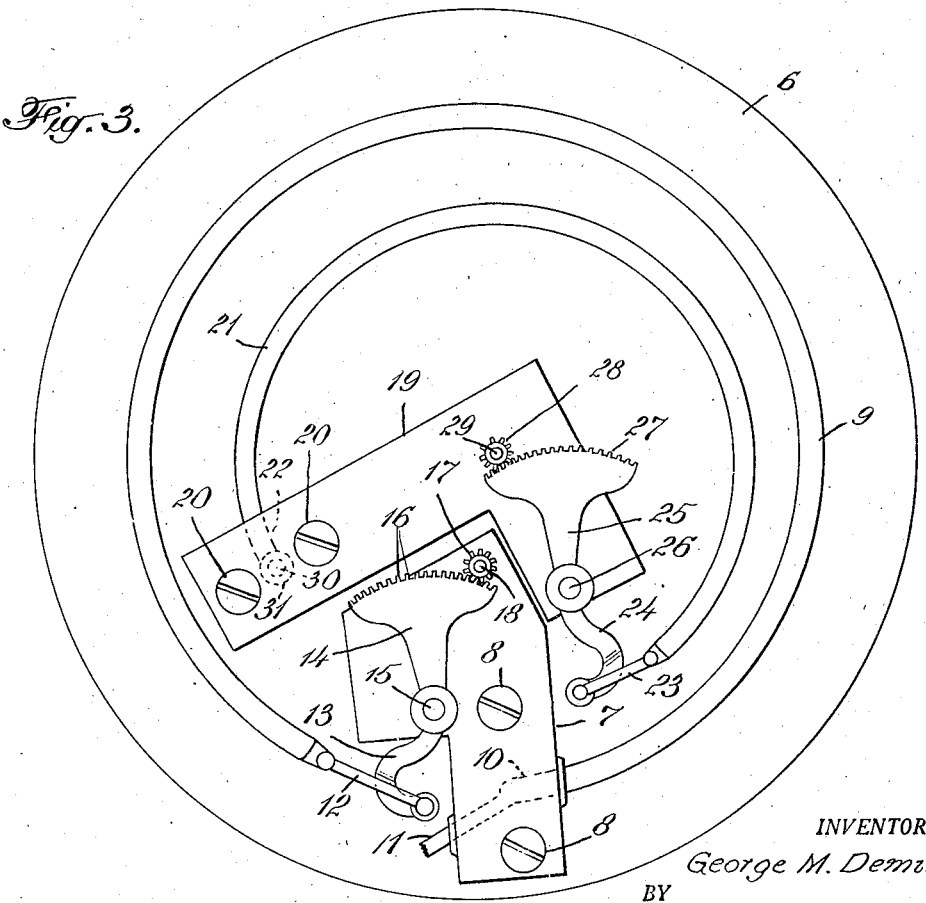
Fig. 3 is a front elevation of the gauge mechanisms as they appear when the gauge casing is removed from the regulator casing.

As best shown in Fig. 3 a block or frame 7 is detachably fastened to the wall 6 of the regulator by means of screws 8. This block supports the Bourdon tube 9 of the high-pressure gauge mechanism and all of the parts actuated by it. One end of the Bourdon tube 9 is mounted in the block 7 as indicated at 10 and is connected to one end of a capillary tube 11 soldered in the block. The other end of the capillary tube is soldered in an appropriate drilling in the regulator casing (not shown) so that it will be in communication with the high-pressure side of the regulator. The free end of the Bourdon tube 9 is pivotally connected by means of a link 12 to an arm 13 extending from a sector gear 14 pivotally mounted on the block 7 at 15. The teeth 16 of the sector gear mesh with a pinion 17 carried by a shaft 18 mounted to turn in the block 7. The outer end of the shaft 18 carries a pointer as will hereinafter appear.

Similarly a second block or frame 19 is detachably fastened to the wall 6 of the regulator by means of screws 20. This block supports the Bourdon tube 21 of the low-pressure gauge mechanism and all of the parts actuated by it. One end of the Bourdon tube 21 is mounted in the block 19 as indicated at 22 and its free end is pivotally connected by means of a link 23 to an arm 24 extending from a sector gear 25 pivotally mounted on the block 19 at 26. The teeth 27 of the sector gear mesh with a pinion 28 carried by a shaft 29 mounted to turn in the block 19. The outer end of the shaft 29 carries a second pointer as will hereinafter appear.

The end 22 of the Bourdon tube 21 may, if desired, be placed in communication with the low-pressure side of the regulator by means of a capillary tube as in the case of the high-pressure Bourdon tube 9, but preferably the end of the Bourdon tube 21 communicates with a passage 30 in the block 19 which registers with a similar passage in the regulator body leading to the low-pressure side when the block 19 is screwed to the wall 6. A gasket 31 is preferably provided where the two passages meet and is clamped by the block 19 against the face of the wall 6 to avoid leakage of gas at this place. This gasket type of joint eliminates the necessity of soldering a capillary tube into a drilling in the regulator casing. It could be employed also in the case of the high-pressure Bourdon tube 9 for placing it in communication with the high-pressure side of the regulator, but the capillary tube type of connection is probably better for this Bourdon tube because there might be some difficulty in effecting a tight enough joint by means of the gasket arrangement to prevent escape of some of the high-pressure gas.

Figure 1:
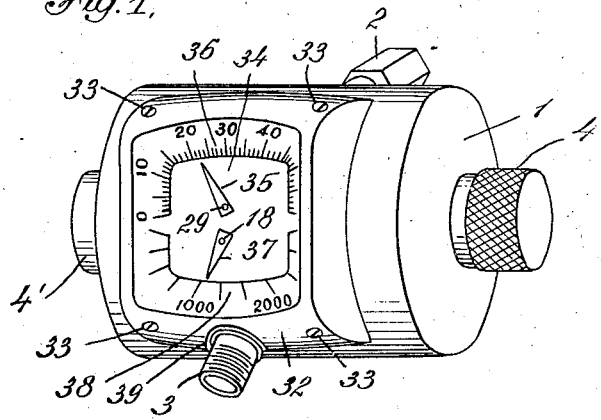
Figure 1 is a perspective view of a pressure regulator and gauge assembly constructed in accordance with the invention.

A gauge casing 32 (Fig. 1) is detachably fastened to the casing of the regulator by means of screws 33. The gauge casing encloses and conceals the two gauge mechanisms fastened to the wall 6. The shaft 29 extends through an opening in the front wall 34 of the gauge casing and at its outer end carries a pointer 35 which cooperates with a low-pressure scale 36 on the gauge casing. Similarly the shaft 18 extends through an opening in the front wall of the gauge casing and at its outer end carries a similar pointer 37 which cooperates with a high-pressure scale 38 on the gauge casing. The pointers may be slipped on their respective shafts with a friction fit like the hands of a watch so that they may be removed when it is desired to remove the gauge casing, or they may be detachably connected to their shafts in any other suitable way.

The gauge casing may be cut away as shown at 39 to accommodate the low-pressure gas outlet nipple 3.

In the illustrated embodiment of the invention the pointer 35 of the upper scale 36 moves in a clockwise direction as the pressure in the low-pressure Bourdon tube 21 increases, and the pointer 37 of the lower scale 38 moves in an anti-clockwise direction as the pressure in the high-pressure Bourdon tube 9 increases. To accomplish this the low-pressure Bourdon tube 21 extends from its mounting block 19 in a clockwise direction while the high-pressure Bourdon tube 9 extends from its mounting tube in an anti-clockwise direction. It would be possible, of course, to have both Bourdon tubes extend from their mounting blocks in the same direction but this would necessitate the use of an idler gear between one of the sector gears and the corresponding pinion if the pointers 35 and 37 are to move as above described.

If the regulator is used to supply heavy gas flows the body of the regulator may become very cold in which event there is a possibility of frost depositing on the gauge mechanism, and to avoid this it may be desirable to interpose a layer of suitable thermal insulating material between the wall 6 of the regulator and the gauge blocks 7 and 19 as indicated at 40 in Fig. 2.

It will now be seen that the gauge casing conforms very well to the shape of the regulator casing and projects but a slight distance from it. The two gauge mechanisms are nested and are both housed in the same gauge casing producing a very compact construction of neat appearance. Access may be had to the gauge mechanisms simply by slipping the pointers 35 and 37 off their shafts, loosening the screws 33, and removing the gauge casing 32 from the regulator body. Either of the gauge mechanisms may then be removed without disturbing the other by removing the screws which fasten its block to the wall 6 of the regulator. Since all parts of the low-pressure gauge mechanism are mounted on and interconnected by the block 19, the removal of this block removes with it all parts of the low-pressure gauge mechanism as a unit, and similarly removal of the block 7 removes with it all parts of the high-pressure gauge mechanism since they are all mounted on and interconnected by this block. Obviously instead of each block or frame 7 and 19 being in one piece it may comprise several portions firmly attached together so that in effect it is unitary.

While my improvements are particularly advantageous in connection with a pressure regulator provided with two gauges, certain features of the invention are applicable to pressure regulators having only one gauge as will be clear from the claim which is not limited to a two-gauge regulator.

I claim:

The combination of a gas pressure regulator, a block detachably mounted on an exterior wall of the regulator, a Bourdon tube mounted on said block and in communication with a part of the interior of the regulator, a pointer shaft mounted to turn on said block, means mounted on said block and connected to the Bourdon tube for turning the pointer shaft when the Bourdon tube moves in response to the pressure within it, a gauge casing covering said block and all parts mounted on it and detachably fastened to the regulator casing, said gauge casing having a wall through which said pointer shaft projects, a scale associated with the gauge casing at the outer side of such wall, and a pointer removably carried by said pointer shaft and cooperating with said scale.

GEORGE M. DEMING.